United States Patent
Taylor (10) Patent No.: US 8,644,300 B2
(45) Date of Patent: Feb. 4, 2014

(54) TELEPHONE SWITCHING SYSTEMS

(75) Inventor: Martin Taylor, Middlesex (GB)

(73) Assignee: Metaswitch Networks Ltd, Enfield (GB)

( * ) Notice: Subject to any disclaimer, the term of this patent is extended or adjusted under 35 U.S.C. 154(b) by 949 days.

(21) Appl. No.: 12/633,709

(22) Filed: Dec. 8, 2009

(65) Prior Publication Data

US 2010/0157987 A1 Jun. 24, 2010

(30) Foreign Application Priority Data

Dec. 9, 2008 (GB) ................................. 0822403.2

(51) Int. Cl.
*H04L 12/66* (2006.01)

(52) U.S. Cl.
USPC ........................................................ 370/352

(58) Field of Classification Search
None
See application file for complete search history.

(56) References Cited

U.S. PATENT DOCUMENTS

| | | | |
|---|---|---|---|
| 2004/0066929 A1* | 4/2004 | Bremer et al. | 379/219 |
| 2007/0047730 A1* | 3/2007 | Bremer et al. | 379/399.01 |
| 2008/0279360 A1* | 11/2008 | Veenstra et al. | 379/211.02 |
| 2010/0111268 A1* | 5/2010 | Brugman et al. | 379/1.03 |
| 2010/0135280 A1* | 6/2010 | Ikegami et al. | 370/352 |

FOREIGN PATENT DOCUMENTS

EP 2051536 A1 * 4/2009

* cited by examiner

*Primary Examiner* — Suk Jin Kang (74) *Attorney, Agent, or Firm* — Baker & Hostetler LLP (57) ABSTRACT

The invention relates to the generation of configuration data for use in the migration of telephone switching systems. Configuration data for use in the migration of subscribers from a first telephone switching system over to a second telephone switching system in a telecommunications network is generated by monitoring signaling information on telephone channels associated with subscribers for telephone calls conducted via the first telephone switching system. The monitored signaling information is then analyzed in relation to call data produced by the first telephone switching system for the calls to identify relationships between the monitored signaling information and call data for calls conducted by subscribers. Configuration data based on the identified relationships is then stored and used to configure the second telephone switching system with mappings between the associated telephone channels and the telephone dialing numbers for subscribers.

17 Claims, 5 Drawing Sheets

TELEPHONE SWITCHING SYSTEMS

RELATED APPLICATIONS

This application claims priority under 35 U.S.C. §119(a) to Great Britain Application No. 0822403.2 filed on Dec. 9, 2008, the entire disclosure of which is hereby incorporated by reference.

BACKGROUND OF THE INVENTION

1. Field of the Invention

This invention relates to methods and apparatus for telephone switching systems in a telecommunications network. In particular, but not exclusively, the invention relates to the generation of configuration data for use in the migration of telephone switching systems.

2. Description of the Related Technology

A major challenge when implementing the migration of an existing telephone switching system, such as a digital telephone switching system, to a new telephone switching system, such as a packet-based telephone switching system, is the task of accurately provisioning the mapping of telephone numbers to physical subscriber lines or channels. For analog lines that are directly connected to the digital telephone switching system, it may be possible to obtain electronic records of such mappings directly from the digital telephone switching system. Such records may be imported into the packet-based switching system by some automated means. However, for lines that are served by digital loop carrier systems, the relationship between analog ports on the digital telephone switching system and analog ports on a central office terminal part of the digital loop carrier system can typically only be recorded by manual means, and such records may be missing, out-of-date, or erroneous. It is a time-consuming and error-prone task to attempt to reconstruct such records, and even when compiled, the details would have to be entered manually into the provisioning interface for the packet-based telephone switching system, which itself is time-consuming and error-prone.

United States patent application no. US-A-2008/0159273 describes a system for facilitating migration from an analog network to a voice over internet protocol (VoIP) network. The system includes a migration broker for implementing line configuration changes from the analog network to the VoIP network on a line by line basis. When a line is to be migrated, a call is made to the migration broker, which interrogates the old switch for data associated with the currently configured line for which the call is being made. The migration broker then supplies the data from interrogation of the old switch to the new switch, and the line is then provisioned under the new switch instead of the old switch.

It would therefore be desirable to provide improved methods and apparatus for automatically generating configuration data for new switching systems in a telecommunications network, in particular when migrating over to a packet-based telephone switching system.

SUMMARY OF CERTAIN INVENTIVE ASPECTS

The system, method, and devices of the present invention each have several aspects, no single one of which is solely responsible for its desirable attributes. Without limiting the scope of this invention, several of its features will now be discussed briefly.

In accordance with a first aspect of the present invention, there is provided a method for generating configuration data for use in the migration of subscribers from a first telephone switching system over to a second telephone switching system in a telecommunications network, each subscriber having an associated telephone channel and a telephone dialing number for telephone calls conducted via the first telephone switching system, the method comprising:

monitoring signaling information on telephone channels associated with the subscribers for telephone calls conducted via the first telephone switching system;

analyzing the monitored signaling information in relation to call data produced by the first telephone switching system for the calls to identify a relationship between the monitored signaling information and the call data for a call conducted by a subscriber; and storing configuration data based on the identified relationship, the configuration data being for configuring the second telephone switching system with a mapping between the associated telephone channel and the telephone dialing number for the subscriber.

Hence, by use of the present invention, details of the mapping between the telephone dialing number and physical telephone channel for a subscriber served by an existing telephone switching system can be generated and used to configure a new telephone switching system to which telephony services are to be migrated to.

In one embodiment of the invention, the monitoring comprises monitoring transitions in signaling states on the telephone channels associated with subscribers. Hence, monitoring apparatus can be used to collect information on signaling states on telephone channels used by subscribers to conduct calls.

In another embodiment of the invention, the signaling state transitions comprise a transition between one or more of an idle and a ringing state, an off-hook and an on-hook state, and an on-hook and an off-hook state. Hence, different state transitions can be monitored in order to determine different types of call activity on the subscriber telephone channels.

According to one arrangement of the invention, the monitoring comprises detecting at least one predetermined sequence of transitions in signaling states on a telephone channel associated with a subscriber. Hence, call activity on subscriber telephone channels can be measured in terms of different sequences of signaling state transitions.

According to embodiments of the invention, the at least one predetermined sequence of transitions include an incoming call sequence which comprises two or more of a signaling state transition from an idle state to a ringing state, a signaling state transition from an on-hook state to an off-hook state; and a signaling state transition from an off-hook state to an on-hook state, whereby the call is identified as an incoming call to the subscriber and the mapping comprises a mapping between the telephone channel associated with the subscriber and a called party telephone dialing number identified in the call data for the call. Hence, an incoming call to a subscriber can be identified by a certain pattern of signaling state transitions corresponding to two or more of the subscriber's telephone ringing, the subscriber picking up the telephone handset, the subscriber conducting the call and the subscriber replacing the telephone handset.

According to other embodiments of the invention, the at least one predetermined sequence of transitions include an outgoing call sequence which comprises one or more of a signaling state transition from an on-hook state to an off-hook state, and a signaling state transition from an off-hook state to an on-hook state, wherein the outgoing call sequence does not include a signaling state transition from an idle state to a ringing state, whereby the call is identified as an outgoing call from the subscriber and the mapping comprises a mapping between the telephone channel associated with the subscriber and a calling party telephone dialing number identified in the call data for the call. Hence, an outgoing call from a subscriber can be identified by a certain pattern of signaling state transitions corresponding to one or more of the subscriber picking up the telephone handset, the subscriber conducting the call and the subscriber replacing the telephone handset, without the subscriber's telephone ringing.

According to another arrangement of the invention, the analyzing comprises identifying a temporal correlation between the call data and the monitored signaling information. Hence, a correlation in time can be used as a measure of agreement between the monitored signaling information and the call data produced by the existing telephone switching system.

In embodiments of the invention, the temporal correlation comprises a correlation between one or more timestamps in the call data and the monitored signaling information. Hence, timestamps can be used to demarcate different events and used to identify different call activity.

In arrangements of the invention, the analyzing comprises analyzing the monitored signaling information to identify a plurality of relationships between the monitored signaling information and the call data for a plurality of calls conducted by the subscribers, and wherein the storing comprises storing configuration data based on the plurality of identified relationships, the configuration data being for configuring the second telephone switching system with a plurality of mappings between associated telephone channels and telephone dialing numbers for the subscribers. Hence, details of the mappings between telephone dialing numbers and telephone channels for a number of subscribers can be generated by analyzing signaling information for a number of calls conducted by the subscribers.

In embodiments of the invention, two or more of the identified relationships correspond to calls conducted by the subscriber, wherein the two or more identified relationships have matching relationships, and wherein the storing comprises storing configuration data based on the two or more identified relationships, the configuration data being for configuring the second telephone switching system with a mapping between the associated telephone channel and telephone dialing number for the subscriber. Hence, a stronger indication of the mapping between the telephone channel and telephone dialing number for a subscriber can be ascertained if multiple calls indicate the same relationship for that subscriber.

Embodiments of the invention may comprise configuring the second telephone switching system with the stored configuration data. Hence, this invention facilitates the replacement of digital switching systems that provide local telephone services via configuration of new switching systems which are to provide the local telephone services.

According to arrangements of the invention, the second telephone switching system comprises a packet-switching system, the monitoring is carried out at least in part by a media gateway connected to the telephone channels, and the configuring comprises connecting the second telephone switching system to the media gateway. Hence, the monitoring apparatus can also be used to interface with the new telephone switching system once telephony services have been migrated over.

In one embodiment of the invention, the media gateway is an analog media gateway, wherein the monitoring of signaling information comprises detecting ringing voltages on the telephone channels. Hence, the invention accommodates migration for subscribers currently having telephony services provided via analog telephony channels.

In another embodiment of the invention, the monitoring is carried out at least in part on the telephones channels via a digital loop carrier system connected to the first telephone switching system, the monitored signaling information comprising digital signal information. Hence, the invention accommodates migration for subscribers currently having telephony services provided via digital telephony channels.

According to some embodiments of the invention, the call data comprises Call Detail Record (CDR) data. Hence, the invention may make use of CDR data produced by the current telephone switching system for telephone calls conducted by subscribers via the current telephone switching system.

According to other embodiments of the invention, the call data comprises Signaling System 7 (SS7) signaling information. Hence, the invention may make use of SS7 signaling information exchanged between a public switched telephone network and the current telephone switching system for telephone calls conducted by subscribers via the current telephone switching system.

In arrangements of the invention, the monitoring of signaling information comprises monitoring telephone number dialing digits dialed by subscribers for outgoing calls conducted via the first telephone switching system. Hence, when subscribers make outgoing telephone calls, the digits they dial corresponding to called parties for those calls can be monitored and matched to called party telephone numbers in call data for those calls. Methods for monitoring telephone number dialing digits will be clear to one skilled in the art, for example using Dual Tone Multi-Frequency (DTMF) signaling techniques.

In accordance with a second aspect of the present invention, there is provided apparatus adapted to perform the method of the first aspect of the invention.

In accordance with a third aspect of the present invention, there is provided a computer program product comprising a computer-readable medium having computer readable instructions recorded thereon, the computer readable instructions being operative, when performed by a computerized device, to cause the computerized device to perform the method of the first aspect of the invention.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Figure 1:
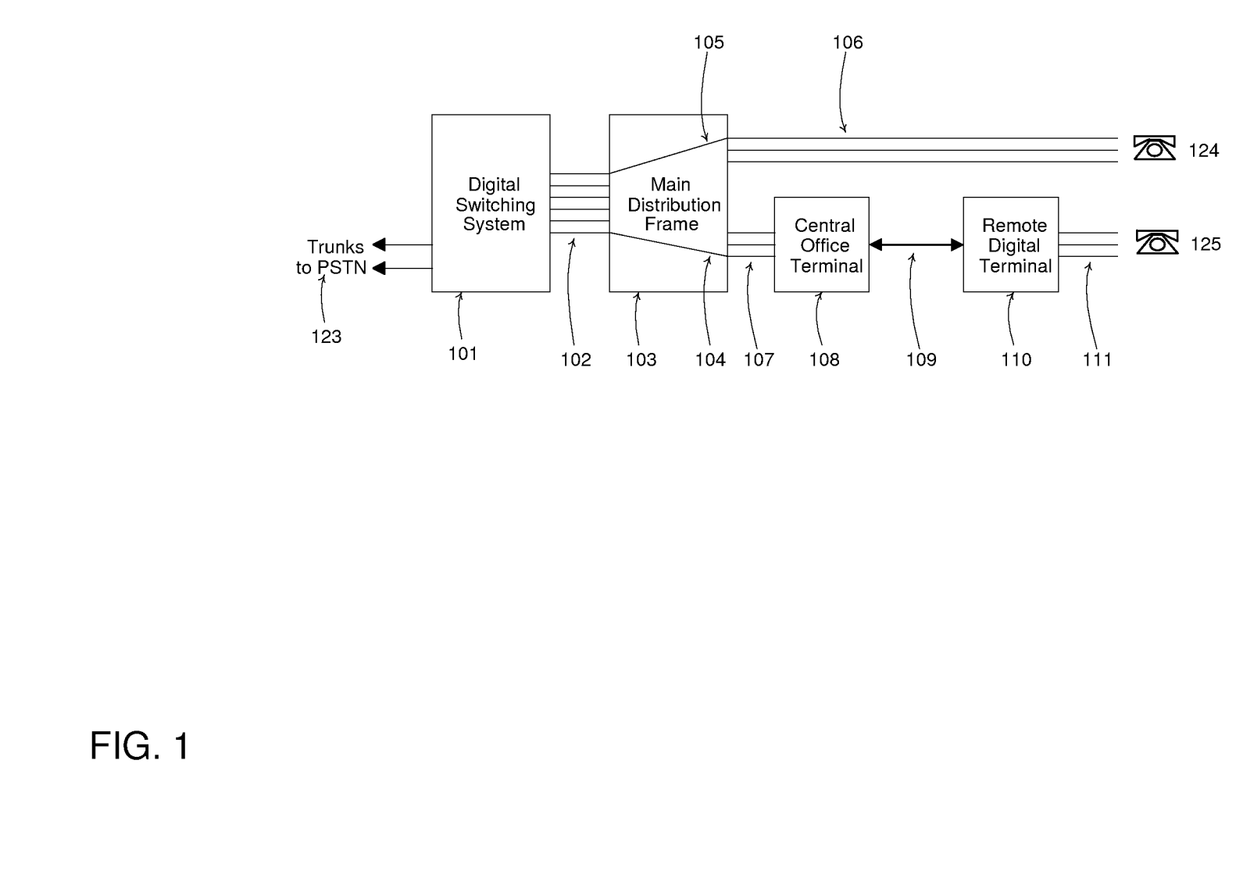
FIG. 1 shows a system diagram of a telecommunications network according to embodiments of the present invention.

FIG. 1 shows a system diagram of a telecommunications network according to embodiments of the present invention. The telecommunications network includes a digital telephone switching system 101, such as a Class 5 switch, which delivers analog telephony services to subscribers via a mix of directly connected telephone channels 106 and telephone channels 111 that are connected via a digital loop carrier (DLC) system. The telephone channels may also be referred to as telephone lines or loops, but are hereinafter referred to as telephone channels. Digital telephone switching system 101 is connected by trunk connections 123 to one or more trunk switching systems, such as Class 4 or tandem switches (not shown), in a public switched telephone network (PSTN) (not shown), and by connections (for example patch lead connections 102) between analog ports on the digital telephone switching system 101 to a main distribution frame 103. Main distribution frame 103 includes cross connections (example 105) to directly connected analog channels 106 (also referred to as lines or loops) which connect to a number of subscriber telephones 124. Main distribution frame 103 also includes cross connections (example 104) to further connections (for example patch lead connections 107) to a Digital Loop Carrier (DLC) system.

A DLC system generally comprises a remote digital terminal 110, a digital central office terminal 108 (also referred to as a local exchange terminal), and a digital transmission facility 109 connecting remote digital terminal 110 and digital central office terminal 108. Digital central office terminal 108 converts the analog signal on connections 107 to a digital signal which it transmits over digital facilities 109, typically a Digital Signal Level 1 transmission facility (DS-1), to remote digital terminal 110, which converts the digital signal back to analog for delivery to a number of subscriber telephones 125 over channels 111. Channels 106 and 111 would typically be Plain Old Telephone Service (POTS) telephone lines.

Digital telephone switching system 101, main distribution frame 103 and central office terminal 108 are typically located within a local telephone exchange (also referred to as a central office). Remote digital terminal 110 is typically located in a street cabinet or underground vault in the street close to an area where telephony services are provided to a number of subscribers. In embodiments of the invention, remote digital terminal 110 is connected to central office terminal 108 by a number of DS-1 facilities, each of which requires a 4-wire transmission path (a transmit pair and a receive pair). These facilities may be multiplexed onto some higher capacity bearer such as a Digital Signal Level 3 (DS-3) transmission facility over coaxial or fiber-optic cabling.

Figure 2:
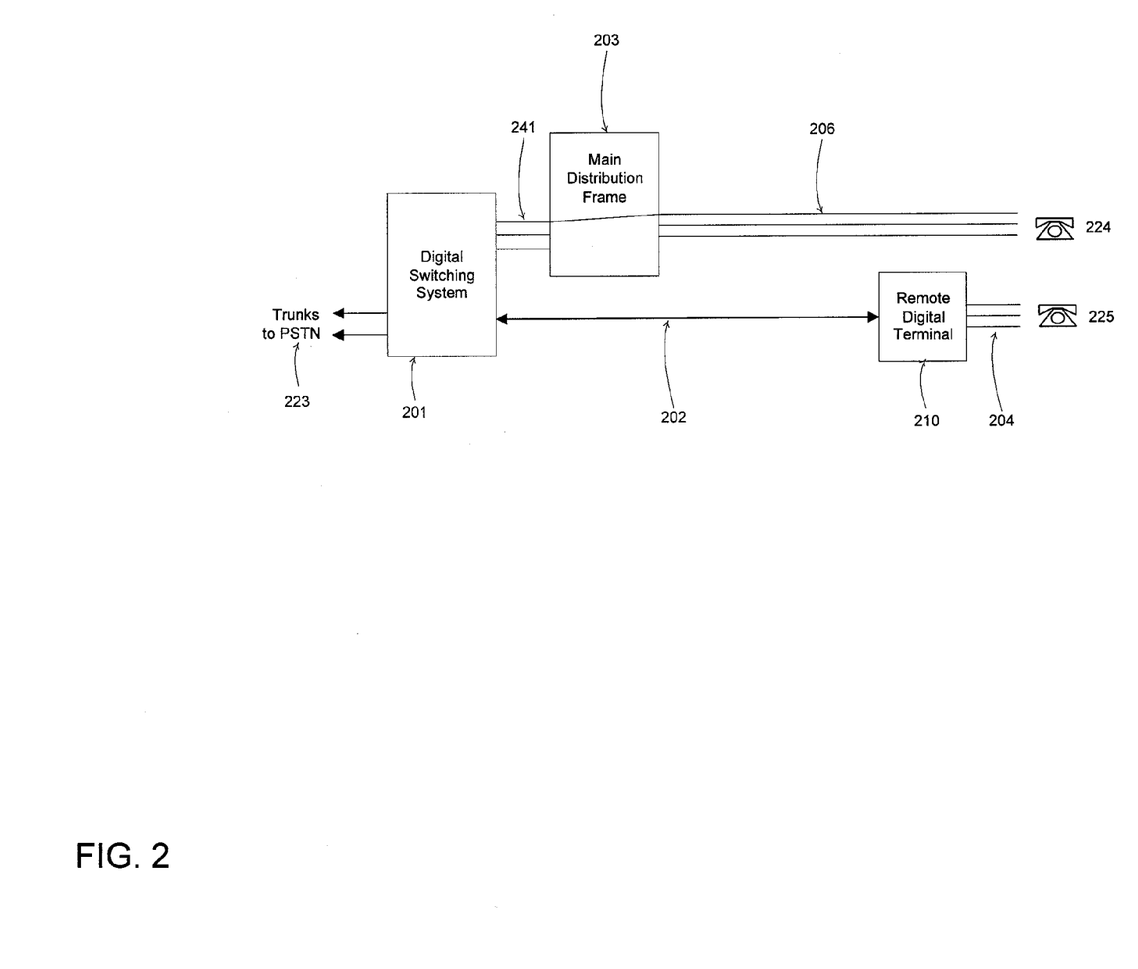
FIG. 2 shows a system diagram of a telecommunications network according to embodiments of the present invention.

FIG. 2 shows a system diagram of a telecommunications network according to embodiments of the present invention. FIG. 2 illustrates an alternative arrangement for the connection of telephony services to subscribers. The telecommunications network includes a digital telephone switching system 201 which is connected by trunk connections 223 to one or more trunk switching systems (not shown) in a public switched telephone network (PSTN) (not shown), and by connections 241 to a main distribution frame 203. Main distribution frame 203 includes cross connections to directly connected channels 206 which connect to subscriber telephones 224.

Digital telephone switching system 201 also delivers telephony services over what is commonly known as an Integrated Digital Loop Carrier (IDLC), where the central office terminal functionality of a DLC is integrated into the digital switching system 201. These services are delivered over digital facilities 202 to a remote digital terminal 210 which is functionally equivalent to the remote digital terminal 110 in FIG. 1. Remote terminal 210 converts the digital signal received from digital switching system 201 back to analog for delivery to subscriber telephones 225 over channels 204.

Embodiments of the invention involve creating configuration (or provisioning data) data for use in migrating telephony services for subscribers from one telephone switching system to another telephone switching system, for example from digital telephone switching system 101/201 to a packet-based switching system. In order to implement such a migration, one or more media gateways 326, 327 are deployed in the local telephone exchange, and the analog lines and digital facilities that connect subscribers to the local telephone exchange are transferred over (or cut-over) to the media gateways 326, 327, as illustrated in FIG. 3.

Following cut-over, lines 306 are connected via a main distribution frame 303 and patch leads 330 to an analog media gateway 327. Remote digital terminal 310 that serves channels 311 is connected via digital facilities 329 to a digital media gateway 326. Both digital media gateway 326 and analog media gateway 327 are controlled by media gateway controller 328 over control connections 335 and 334 respectively that make use of standard media gateway control protocols such as the Media Gateway Control Protocol (MGCP) or the Gateway Control Protocol (Megaco or H.248). Digital media gateway 326 and analog media gateway 327 are connected to a packet-based switching system provided by media gateway controller 328 and/or located in packet network 333.

Figure 3:
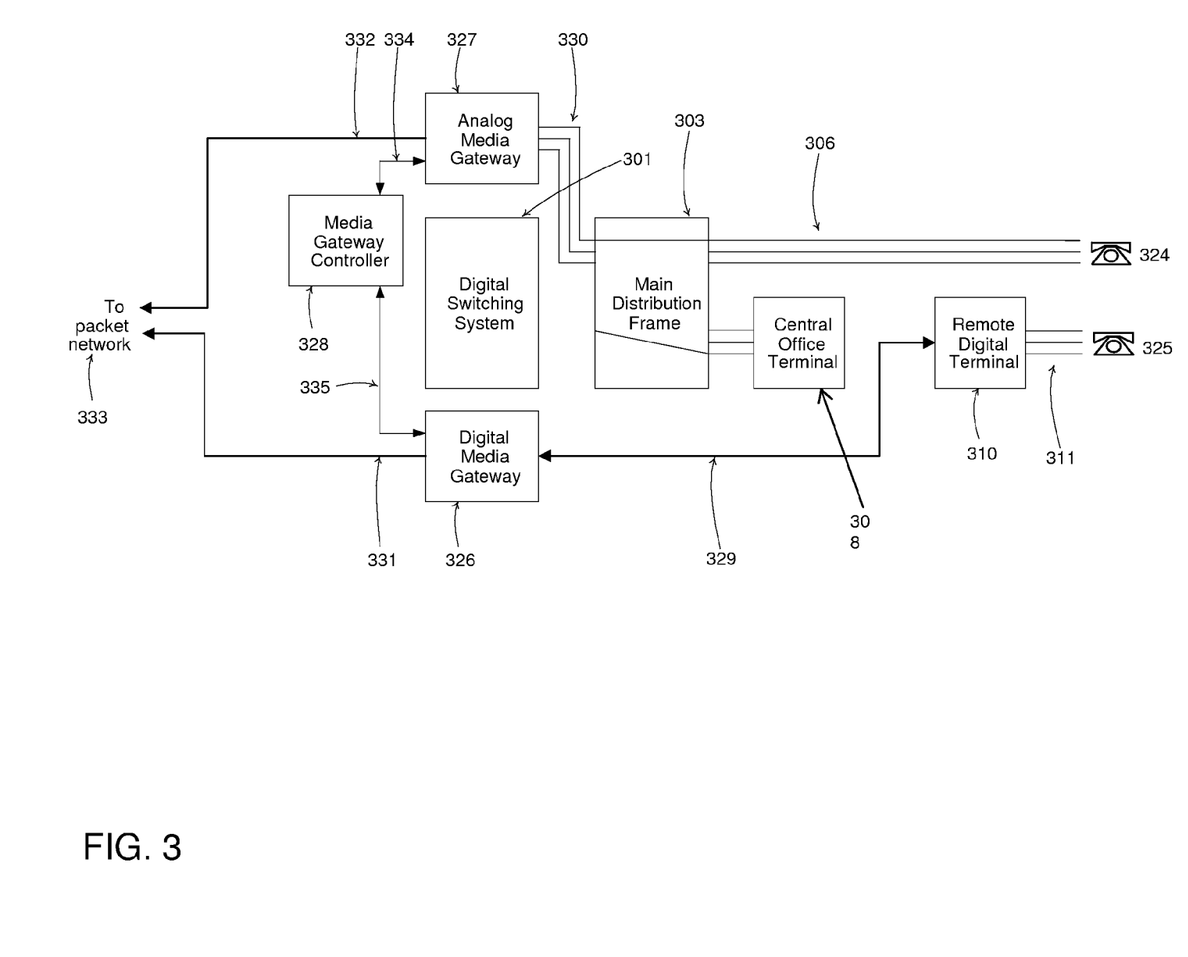
FIG. 3 shows a system diagram of a telecommunications network according to embodiments of the present invention.

The packet-based switching system may be implemented partly or entirely by media gateway controller 328 depicted in FIG. 3. The packet-based switching system may be implemented in packet network 333 in the form of a softswitch, service platform or call agent separate to media gateway controller 328 and may perform other functions in packet network 333 typically associated with such entities. The packet-based switching system may provide call processing intelligence for use in the selection of processes that can be applied to calls, routing for calls within the telecommunications network based on signaling and subscriber database information, the ability to transfer control of calls to other network elements, and management functions such as provisioning, fault detection and billing.

Once digital media gateway 326, analog media gateway 327 and media gateway controller 328 are in place and fully operational, digital switching system 301 and central office terminal 308 may be decommissioned and removed.

Embodiments of the invention tackle the problem of provisioning the mapping between telephone dialing numbers and telephone channels associated with subscribers when telephony services for those subscribers are migrated from existing telephone systems, such as those depicted in FIGS. 1 and 2, over to a new telephone switching system such as that depicted in FIG. 3. The telephone channels correspond to subscriber telephone lines or loops which connect to the subscriber telephones. It is generally unknown which channels correspond to which telephone dialing numbers and such information is required when configuring or provisioning a new telephone switching system such as a packet-based telephone switching system.

Embodiments of the invention involve techniques whereby configuration data including the mappings between telephone numbers and telephone channels of subscribers served by an existing digital switching system such as 101 and central office terminal 108 via a remote digital terminal 110 as depicted in FIG. 1 may be learned automatically. Similarly, embodiments of the present invention involve techniques whereby the mapping between the telephone numbers of subscribers served by a digital switching system 201 and a remote digital terminal 210 as depicted in FIG. 2 may be learned automatically.

When cut-over (or migration) from the existing digital switching system to a new telephone switching system (for example a packet-based switching system as depicted in FIG. 3) is carried out, the configuration data can be used to configure the new telephone switching system. Such techniques may be implemented using apparatus as depicted in FIG. 4.

Figure 4:
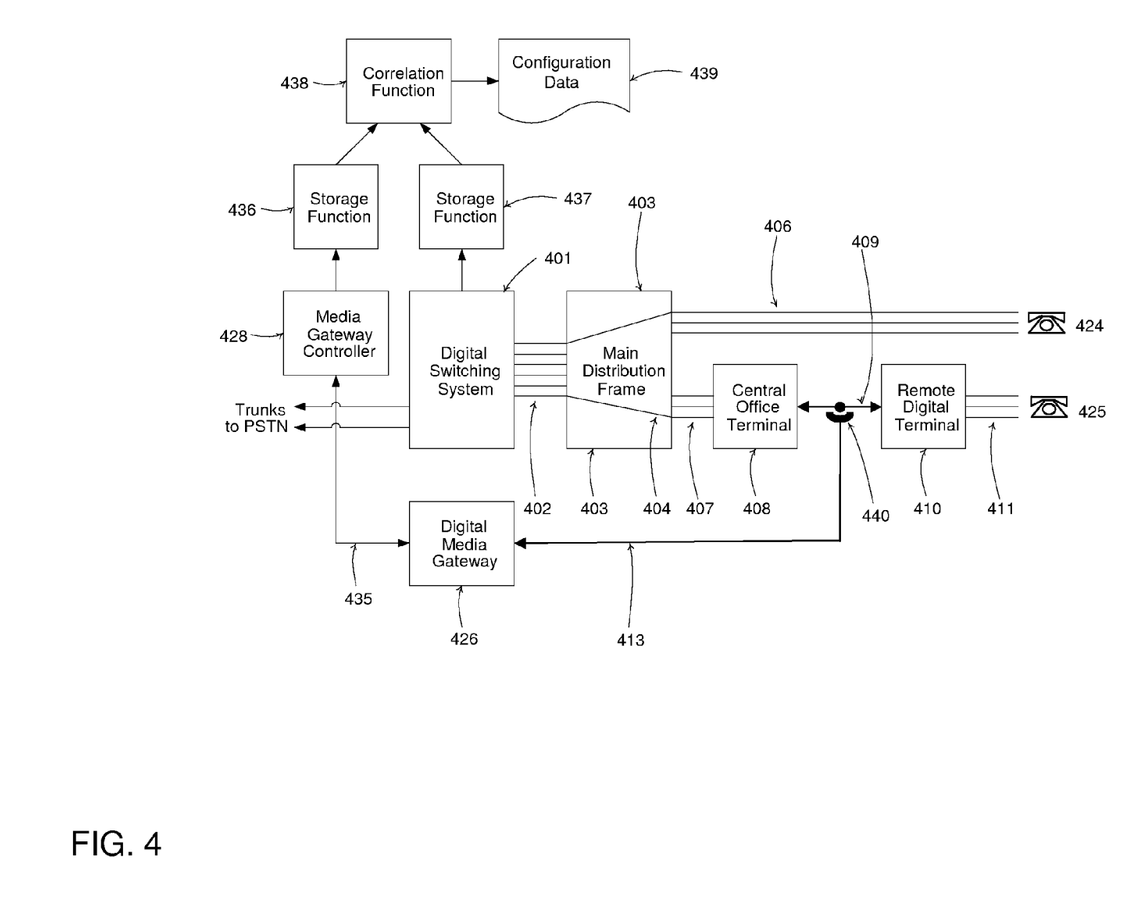
FIG. 4 shows a system diagram of a telecommunications network according to embodiments of the present invention.

FIG. 4 shows a system diagram of a telecommunications network according to embodiments of the present invention. FIG. 4 includes monitoring apparatus in the form of a digital media gateway 426 deployed in a local telephone exchange. The digital ports 440 of digital media gateway 426 are bridged onto, i.e. connected electrically in parallel with, the existing digital facilities 409 from the local telephone exchange to remote digital terminal 410. The ports 440 of digital media gateway 426 are configured so as to receive signals from digital facilities 409, but not to transmit signals onto digital facilities 409, i.e. digital media gateway passively monitors digital facilities 409 but does not interfere with transmissions on those facilities.

Digital facilities 409 carry signaling information on a number of telephone channels associated with subscribers for calls to and from subscriber telephones 425. Digital media gateway 426 is configured to monitor signaling information on the telephone channels and the signaling information is analyzed in relation to call data produced by digital telephone switching system 401 to identify relationships between the monitored signaling information and the call data for calls conducted by subscribers.

In embodiments of the present invention, the monitoring includes monitoring transitions in signaling states on the subscriber telephone channels. A transition in signaling state may occur when digital switching system 401 applies ringing voltage to a channel, or when a subscriber telephone connected to a channel goes off-hook. Such changes of signaling state are reported by digital media gateway 426 and logged in a storage function 436 via links 435 to media gateway controller 428.

In embodiments of the invention, digital switching system 401 produces call data in the form of records commonly known as call detail records (CDRs) which contain details of calls that have passed through digital switching system 401. A call detail record for a call will contain, at a minimum, data relating to the calling party telephone number, the called party telephone number, a timestamp denoting when the call started, and the duration of the call. A timestamp for the end of a call can be deduced by adding the call duration to the timestamp associated with the start of the call. The call detail records are stored by a storage function 437, either on a call-by-call basis or periodically in batches for a number of calls.

The logging of signaling state transitions can be continued for a plurality of telephone calls for a plurality of subscribers, preferably until at least most of the subscribers served by digital switching system 401 have made or received one or more phone calls.

Once a number of calls have been made via digital facilities 409 on telephone channels 411 served by remote digital terminal 410, a correlation function 438 is used to compare details of signaling state transitions on the logical channels of the digital facilities with call detail record data generated by digital switching system 401 for calls to and from the subscribers. Each of the logical channels corresponds to a telephone line serving one of subscriber telephones 425.

A correlation function 438 compares timestamps on signaling transition events in the monitored signaling information with timestamps on the call detail record data to identify relationships between the monitored signaling information and the call detail record data for calls conducted by subscribers. If a relationship for a call is identified, the relationship can be used to deduce which telephone number is associated with which logical channel, i.e. a mapping between a subscriber's telephone number and the telephone channel on which the subscriber conducts telephone calls via digital switching system 401. This information is stored as configuration data 439 and can be used to configure telephony services for that subscriber on the new telephone switching system which is being migrated to.

The monitored signaling state transitions include (but are not limited to) transitions between idle and ringing states, and transitions between on-hook state and off-hook states. The digital media gateway reports each such change of state, the details of which are passed by media gateway controller 428 or by some other interface means to a storage function 436, where a record is created that includes a timestamp (typically accurate to a few milliseconds), the identity of the logical channel on which the state transition was observed, and the nature of the state transition (for example, idle state to ringing state).

The correlation function 438 retrieves details of signaling transitions from storage function 436 and also retrieves call detail record data from storage function 437, and correlates signaling transition events for each logical channel in the order that they were received.

As an example, when the correlation function sees a transition from an idle state to a ringing state on a given logical channel, followed by a transition from on-hook state to an off-hook state on the same channel, followed by a transition from an off-hook state to on-hook state on the same channel, then it is deduced that these events are associated with a telephone call that has been received by the subscriber associated with that logical channel, i.e. an incoming call to a subscriber on a particular telephone number and telephone line pair. The call detail record data is then analyzed in order to identify the record that contains the details for that call. If call detail record data for a call is identified whose start timestamp is within a few seconds of the on-hook to off-hook state transition, and whose duration is within a few seconds of the interval between the on-hook to off-hook state transition and the off-hook to on-hook state transition, then the called party telephone number is extracted from the call detail record for the call, and the identified relationship between the called number and the logical channel is noted.

As another example, when the correlation function sees a transition from off-hook state to on-hook state on the same channel, which is not preceded by any ringing state, followed by a transition from off-hook state to on-hook state on the same channel, then it is deduced that these events are associated with a telephone call that has been made by the subscriber associated with that logical channel, i.e. an outgoing call from a subscriber on a particular telephone number and telephone channel pair. The call detail record data is then analyzed in order to identify the record that contains the details for that call. If a call detail record data for a call is identified whose start timestamp is some number of seconds later than the on-hook to off-hook state transition (this offset representing the time taken by the subscriber to dial the telephone number being called), and whose duration is approximately the same number of seconds less than the interval between the on-hook to off-hook state transition and the off-hook to on-hook state transition, then the calling party telephone number is extracted from the call detail record for the call, and the identified relationship between the calling number and the logical channel is noted.

In each case, if no matching call detail record data is found, the correlation function does not store a record, but continues to look for sequences of state transitions on the given logical channel.

The analyzing of monitored signaling information may identify a plurality of relationships between the monitored signaling information and the call data for a plurality of calls conducted by subscribers. This allows configuration data to be stored which includes records of a plurality of mappings between associated telephone channels and telephone dialing numbers for the subscribers.

The correlation function analyses the stored records, each of which contains a logical channel identity and a deduced telephone dialing number, in order of logical channel identity.

When two or more identified relationships correspond to calls conducted by the same subscriber and the two or more identified relationships have matching relationships, then a mapping between the telephone channel and telephone dialing number associated with that subscriber can be extracted with more certainty than if only a single relationship is identified for a subscriber.

Where all of the records for a given logical channel include the same deduced telephone dialing number, this indicates that correlation function 438 has found an unambiguous match between the logical channel identity and the telephone number of the subscriber whose line is served by this logical channel, i.e. the mapping between the telephone number and telephone line for a subscriber is known to a good level of certainty.

The correlation function 438 outputs the mapping between telephone channel and telephone dialing number for each subscriber as a record in a file of configuration data 439 (or provisioning data) which can subsequently be loaded into media gateway controller 328/428 for the purposes of provisioning telephone services for those subscribers served by a new telephone switching system.

As well as functioning as monitoring apparatus during the analysis stage before cut-over, digital media gateway 426 can also be employed once cut-over to a new telephone switching system has been carried out to interface digital signals from remote digital terminal 310 for subscribers channels 311 with media gateway controller 328, as shown by digital media gateway 326 in FIG. 3.

In embodiments of the invention, digital media gateway 426 is implemented as the MetaSwitch™ MG2510 media gateway product a provided by Data Connection™ Limited equipped with one or more MetaSwitch™ PB3100 gateway cards (also provide by Data Connection™t Limited) that have sixteen DS-1 ports. Digital media gateway 426 would normally be connected to DS-1 digital facilities inside the local telephone exchange using a patch cable connecting the DS-1 ports on central office terminal 408 to a patch panel or cross-connect that serves the outside plant facilities or cabling. In embodiments of the invention, such connections are replaced by a "Y" cable, which provides a 4-wire connection (2 wires for transmit, and 2 wires for receive) between central office terminal 408 and the outside plant, and which in turn provides a spur comprising 2 wires connected to the upstream path (from remote digital terminal 410 to central office terminal 408). The 2-wire spur is connected to the receive port of digital media gateway 426. By this means, digital media gateway 426 is able to monitor the signaling that is flowing from remote digital terminal 410 to central office terminal 408, including off-hook and on-hook transitions.

Figure 5:
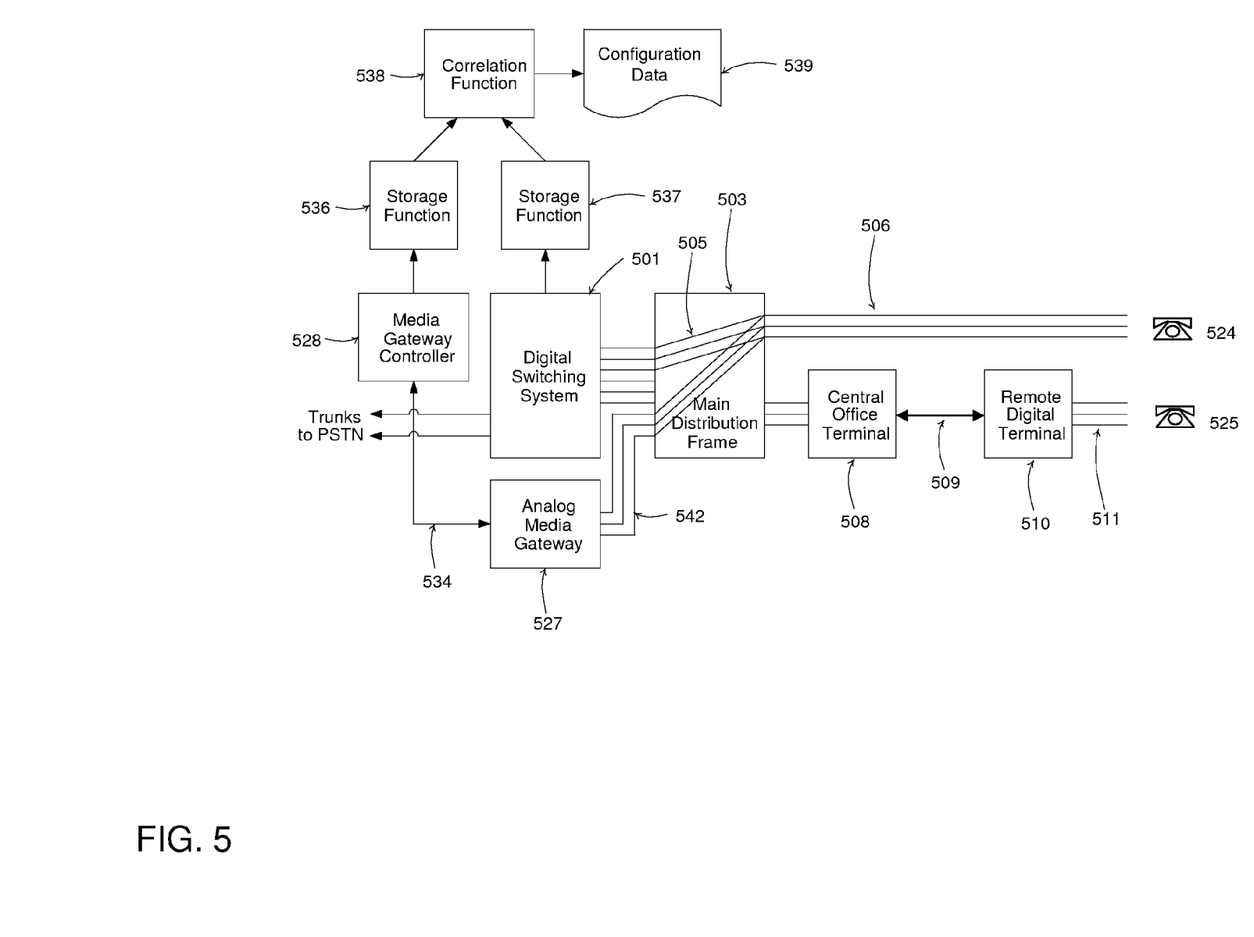
FIG. 5 shows a system diagram of a telecommunications network according to embodiments of the present invention.

FIG. 5 shows a system diagram of a telecommunications network according to embodiments of the present invention. The telecommunications network includes a digital telephone switching system 501, which delivers analog telephony services to subscribers via a mix of directly connected telephone channels 506 and telephone channels 511 that are connected via a DLC system 508, 509, 510. Digital telephone switching system 501 is connected to one or more trunk switching systems in a public switched telephone network (PSTN) (not shown), and to a main distribution frame 503. Main distribution frame 503 includes cross connections (examples 505) to directly connected analog channels 506 which connect to a number of subscriber telephones 524. Main distribution frame 503 also includes cross connections (not shown) to DLC system 508, 509, 510 which connects to a number of subscriber telephones 525.

FIG. 5 includes monitoring apparatus in the form of an analog media gateway 527 deployed in a local telephone exchange. The analog ports 542 of analog media gateway 527 are bridged onto the existing analog telephone channels 506 via main distribution frame 503 and are configured so as to receive signals from analog channels 506, but not to transmit signals onto them, so as not to interfere with transmissions on those channels.

Analog channels 506 carry signaling information on a number of telephone channels associated with subscribers for calls to and from subscriber telephones 524. Analog media gateway 527 is configured to monitor signaling information on the telephone channels and the signaling information is analyzed in relation to call data produced by digital telephone switching system 501 to identify relationships between the monitored signaling information and the call data for calls conducted by subscribers.

FIG. 5 shows an alternative to arrangement to FIG. 4 where instead of monitoring digital facilities 509, monitoring apparatus monitors analog channels 506. In this arrangement, the monitoring apparatus is in the form of an analog media gateway 527 where each analog port of the analog media gateway is bridged onto an analog channel so as to be able to detect whether ringing voltage is applied to the channel or not. Changes in ringing voltages indicate transitions in signaling states, which are then reported by analog media gateway 527 via links 534 to media gateway controller 528 and logged in a storage function 536.

Similarly to the embodiment of FIG. 4, a correlation function 538 is used to compare details of signaling state transitions on the logical channels with call detail record data generated by digital switching system 501 for calls to and from the subscribers. Correlation function 538 compares timestamps on signaling transition events in the monitored signaling information with timestamps on the call detail record data to identify relationships between the monitored signaling information and the call detail record data for calls conducted by subscribers.

The relationships can be used to deduce which telephone numbers are associated with which logical channel, i.e. a mapping between a subscriber's telephone number and the telephone channel on which the subscriber conducts telephone calls via digital switching system 501. This information is stored as configuration data 539 and can be used to configure telephony services for that subscriber on the new telephone switching system which is being migrated to.

As well as functioning as monitoring apparatus during the analysis stage before cut-over, analog media gateway 527 can also be employed once cut-over to a new telephone switching system has been carried out to interface analog signals from main distribution frame 303 for subscribers channels 306 with media gateway controller 328, as shown by analog media gateway 327 in FIG. 3.

The way in which analog media gateway 527 is connected in order to monitor signaling information for loops 506 is different from the way in which digital media gateway 426 is connected as described above in relation to FIG. 4. Different connections are required because analog signals use a two-wire path for both directions of transmit and receive, whereas digital signals use separate two-wire paths for transmit and receive. A Y-cable of some kind would still be used (or a logical Y-cable, which might take the form of an intermediate distribution frame with Y-ports). In a normal operation mode, analog media gateway 527 would normally drive ringing voltage and detect off-hook transitions. However, to passively monitor signaling information as in the present invention, analog media gateway 527 would support a passive ringing detection mode (different from its normal mode of operation) which would allow simply detection and reporting of the presence of a ringing voltage.

The above embodiments are to be understood as illustrative examples of the invention. Further embodiments of the invention are envisaged.

In alternative embodiments of the invention, call data in the form of signaling system 7 (SS7) signaling information produced by digital switching system 501 may be employed. Such SS7 signaling information is used by digital switching system 501 to communicate with the rest of the PSTN network for calls conduct via the digital switching system 501. Such SS7 call data could be extracted by network snooping methods known in the art and can be used instead of, or in addition to, call detail record data to identify relationships with the monitored signaling information collected by analog and digital media gateways 527, 426 for calls conducted by subscribers.

In further alternative embodiments of the invention, telephone dialing numbers may be correlated with subscriber telephone channels by monitoring telephone dialing digits dialed by subscribers for outgoing calls and correlating these with call data such as call detail records produced by the digital switching system or with SS7 signaling messages exchanged with the public switched telephone network by the digital switching system.

In other arrangements of the invention, the monitoring of signaling information comprises monitoring telephone number dialing digits dialed by subscribers for outgoing telephone calls conducted via the first telephone switching system. Hence, when subscribers make outgoing telephone calls, the digits they dial corresponding to the telephone numbers of called parties for those calls can be monitored and matched to called party telephone numbers in call data for those calls. Methods for monitoring telephone number dialing digits will be clear to one skilled in the art, for example using Dual Tone Multi-Frequency (DTMF) signaling techniques.

Whilst the embodiment of FIG. 4 and the embodiments have been described separately above, embodiments within the scope of the invention include a combination of these embodiments where both an analog media gateway and a digital media gateway can be used to monitor signaling information on analog and digital facilities respectively, in order to generate configuration data for the migration of subscribers served by a combination of analog and digital facilities over to a new telephone switching system.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method for generating configuration data for use in the migration of subscribers from a first telephone switching system over to a second telephone switching system in a telecommunications network, each subscriber having an associated telephone channel and a telephone dialing number for telephone calls conducted via the first telephone switching system, the method comprising:

monitoring signaling information on telephone channels associated with the subscribers for telephone calls conducted via the first telephone switching system;

analyzing the monitored signaling information in relation to call data produced by the first telephone switching system for the calls to identify a relationship between the monitored signaling information and the call data for a call conducted by a subscriber, the monitored signaling information for the calls being different from the call data produced by the first telephone switching system for the calls, wherein the analyzing comprises identifying a temporal correlation between one or more timestamps in the call data and the monitored signaling information; and storing configuration data based on the identified relationship, the configuration data being for configuring the second telephone switching system with a mapping between the associated telephone channel and the telephone dialing number for the subscriber.

2. The method of claim 1, wherein the monitoring comprises monitoring transitions in signaling states on the telephone channels associated with subscribers.

3. The method of claim 2, wherein the signaling state transitions comprise a transition between one or more of:
an idle and a ringing state,
an off-hook and an on-hook state, and
an on-hook and an off-hook state.

4. The method of claim 2, wherein the monitoring comprises detecting at least one predetermined sequence of transitions in signaling states on a telephone channel associated with a subscriber.

5. The method of claim 4, wherein the at least one predetermined sequence of transitions includes an incoming call sequence which comprises two or more of:
a signaling state transition from an idle state to a ringing state;
a signaling state transition from an on-hook state to an off-hook state; and
a signaling state transition from an off-hook state to an on-hook state,
wherein the call is identified as an incoming call to the subscriber and the mapping comprises a mapping between the telephone channel associated with the subscriber and a called party telephone dialing number identified in the call data for the call.

6. The method of claim 4, wherein the at least one predetermined sequence of transitions include an outgoing call sequence which comprises one or more of:
a signaling state transition from an on-hook state to an off-hook state; and
a signaling state transition from an off-hook state to an on-hook state,
wherein the outgoing call sequence does not include a signaling state transition from an idle state to a ringing state, and wherein the call is identified as an outgoing call from the subscriber and the mapping comprises a mapping between the telephone channel associated with the subscriber and a calling party telephone dialing number identified in the call data for the call.

7. The method of claim 1, wherein the analyzing comprises analyzing the monitored signaling information to identify a plurality of relationships between the monitored signaling information and the call data for a plurality of calls conducted by the subscribers, and
wherein the storing comprises storing configuration data based on the plurality of identified relationships, the configuration data being for configuring the second telephone switching system with a plurality of mappings between associated telephone channels and telephone dialing numbers for the subscribers.

8. The method of claim 7, wherein two or more of the identified relationships correspond to calls conducted by the subscriber, and
wherein the two or more identified relationships have matching relationships, and
wherein the storing comprises storing configuration data based on the two or more identified relationships, the configuration data being for configuring the second telephone switching system with a mapping between the associated telephone channel and telephone dialing number for the subscriber.

9. The method of claim 1, further comprising configuring the second telephone switching system with the stored configuration data.

10. The method of claim 1, wherein the second telephone switching system comprises a packet-switching system, and
wherein the monitoring is carried out at least in part by a media gateway connected to the telephone channels, and
wherein the configuring comprises connecting the second telephone switching system to the media gateway.

11. The method of claim 10, wherein the media gateway is an analog media gateway, and
wherein the monitoring of signaling information comprises detecting ringing voltages on the telephone channels.

12. The method of claim 1, wherein the monitoring is carried out at least in part on the telephones channels via a digital loop carrier system connected to the first telephone switching system, the monitored signaling information comprising digital signal information.

13. The method of claim 1, where the call data comprises Call Detail Record (CDR) data.

14. The method of claim 1, wherein the call data comprises Signaling System 7 (SS7) signaling information.

15. The method of claim 1, wherein the monitoring of signaling information comprises monitoring telephone number dialing digits dialed by subscribers for outgoing calls conducted via the first telephone switching system.

16. A computerized device for generating configuration data for use in the migration of subscribers from a first telephone switching system over to a second telephone switching system in a telecommunications network, each subscriber having an associated telephone channel and a telephone dialing number for telephone calls conducted via the first telephone switching system, the computerized device comprising a processor configured to:
monitor signaling information on telephone channels associated with the subscribers for telephone calls conducted via the first telephone switching system;
analyze the monitored signaling information in relation to call data produced by the first telephone switching system for the calls to identify a relationship between the monitored signaling information and the call data for a call conducted by a subscriber, the monitored signaling information for the calls being different from the call data produced by the first telephone switching system for the calls, wherein the monitored signaling information in relation to the call data produced by the first telephone switching system is analyzed by identifying a temporal correlation between one or more timestamps in the call data and the monitored signaling information; and
store configuration data based on the identified relationship, the configuration data being for configuring the second telephone switching system with a mapping between the associated telephone channel and the telephone dialing number for the subscriber.

17. A non-transitory computer-readable medium having computer readable instructions recorded thereon, the computer readable instructions being operative, when executed by a processor of computerized device, to cause the computerized device to perform a method for generating configuration data for use in the migration of subscribers from a first telephone switching system over to a second telephone switching system in a telecommunications network, each subscriber having an associated telephone channel and a telephone dialing number for telephone calls conducted via the first telephone switching system, the method comprising:
monitoring signaling information on telephone channels associated with the subscribers for telephone calls conducted via the first telephone switching system;
analyzing the monitored signaling information in relation to call data produced by the first telephone switching system for the calls to identify a relationship between the monitored signaling information and the call data for a call conducted by a subscriber, the monitored signaling information for the calls being different from the call data produced by the first telephone switching system for the calls, wherein the analyzing comprises identifying a temporal correlation between one or more timestamps in the call data and the monitored signaling information; and
storing configuration data based on the identified relationship, the configuration data being for configuring the second telephone switching system with a mapping between the associated telephone channel and the telephone dialing number for the subscriber.

* * * * *